United States Patent
Lam-Ki et al.

(10) Patent No.: US 11,171,535 B2
(45) Date of Patent: Nov. 9, 2021

(54) ELECTRIC MOTOR AND HOUSING WITH INTEGRATED HEAT EXCHANGER CHANNELS

(71) Applicant: Hamilton Sundstrand Corporation, Charlotte, NC (US)

(72) Inventors: Jorge Lam-Ki, Bay Shore, NY (US); Roberto J. Perez, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 201 days.

(21) Appl. No.: 16/510,413

(22) Filed: Jul. 12, 2019

(65) Prior Publication Data
US 2021/0013767 A1    Jan. 14, 2021

(51) Int. Cl.
*H02K 5/20*    (2006.01)
*H02K 5/18*    (2006.01)
(Continued)

(52) U.S. Cl.
CPC ............. *H02K 5/20* (2013.01); *B64D 13/006* (2013.01); *B64D 13/08* (2013.01); *H02K 5/18* (2013.01); *H02K 9/16* (2013.01); *H02K 15/14* (2013.01)

(58) Field of Classification Search
CPC ...... B64D 13/006; B64D 13/08; H02K 15/14; H02K 5/18; H02K 5/20; H02K 9/16; H02K 9/18
(Continued)

(56) References Cited

U.S. PATENT DOCUMENTS 4,347,451 A * 8/1982 Mizuyama ............. H02K 5/128
                                                       310/59
5,331,238 A * 7/1994 Johnsen ................. H02K 1/185
                                                       310/216.049
(Continued)

FOREIGN PATENT DOCUMENTS

DE    102014102632 A1    9/2014
EP         0899852 A1    3/1999
(Continued)

OTHER PUBLICATIONS

Extended European Search Report for EP Application No. 19215597.6, dated Jun. 30, 2020, 10 pages.

*Primary Examiner* — Alex W Mok
(74) *Attorney, Agent, or Firm* — Kinney & Lange, P.A.

(57) ABSTRACT

An embodiment of an electric motor assembly includes a stator assembly extending generally along the longitudinal axis and at least partially enclosing a rotor assembly also extending along the longitudinal axis. The rotor assembly includes a rotating portion and one or more sets of rotor windings. The stator assembly includes a stationary housing having at least an inner wall and an outer wall, and one or more sets of stator windings in electromagnetic communication with the one or more sets of rotor windings. A heat exchanger is integrally formed into the housing, and includes a plurality of dividing walls extending between the inner and outer housing walls. The plurality of dividing walls are arranged at least partially circumferentially around the longitudinal axis to define, with the inner and outer walls, a corresponding plurality of integral heat exchanger channels arranged at least partially circumferentially around the one or more sets of stator windings. A plurality of rib turbulators are disposed on at least a channel-facing surface of the inner wall.

16 Claims, 3 Drawing Sheets

(51) Int. Cl.
*H02K 9/16* (2006.01)
*H02K 15/14* (2006.01)
*B64D 13/00* (2006.01)
*B64D 13/08* (2006.01)

(58) Field of Classification Search
USPC .......................................................... 310/65
See application file for complete search history.

(56) References Cited

U.S. PATENT DOCUMENTS

| | | | | |
|---|---|---|---|---|
| 5,869,912 | A * | 2/1999 | Andrew | H02K 1/20 310/52 |
| 6,317,963 | B1 * | 11/2001 | Powers | H02K 5/1732 29/596 |
| 9,920,635 | B2 * | 3/2018 | Bommisetty | F01D 5/187 |
| 2008/0030086 | A1 * | 2/2008 | Noda | H02K 9/12 310/57 |
| 2008/0100159 | A1 * | 5/2008 | Dawsey | B60L 1/003 310/54 |
| 2008/0179972 | A1 * | 7/2008 | Aoki | B21J 5/068 310/52 |
| 2009/0009013 | A1 | 1/2009 | Baumann et al. | |
| 2010/0244595 | A1 * | 9/2010 | Sheth | E21B 43/128 310/54 |
| 2013/0062976 | A1 * | 3/2013 | Rai | H02K 9/14 310/61 |
| 2014/0021812 | A1 | 1/2014 | Hashish | |
| 2014/0070644 | A1 | 3/2014 | Chuang | |
| 2014/0217841 | A1 * | 8/2014 | Riegels | H02K 5/20 310/54 |
| 2014/0241865 | A1 * | 8/2014 | Arimatsu | F01D 25/12 415/180 |
| 2014/0265667 | A1 * | 9/2014 | Boxberg | H02K 1/32 310/59 |
| 2016/0056682 | A1 * | 2/2016 | Cocks | H02K 9/06 310/59 |
| 2016/0294231 | A1 * | 10/2016 | Andres | H02K 1/20 |
| 2017/0012504 | A1 | 1/2017 | Sever | |

FOREIGN PATENT DOCUMENTS

| | | | |
|---|---|---|---|
| RU | 2539691 C1 | 1/2015 | |
| WO | WO-2014032876 A2 * | 3/2014 | ............ H02K 5/18 |
| WO | WO2015/111018 A2 | 7/2015 | |
| WO | WO2018/114037 A1 | 6/2018 | |

* cited by examiner

ELECTRIC MOTOR AND HOUSING WITH INTEGRATED HEAT EXCHANGER CHANNELS

BACKGROUND

The disclosure relates generally to electric motors and more specifically to electric motors with cooling features.

With increased demands for efficiency and component life, electric motors such as those used in cabin air conditioning (CAC) systems can experience thermal issues over a shorter time frame. This can cause more frequent breakdowns and replacement, causing an aircraft to be taken out of service more often.

Current motors utilize a monolithic stator housing with "back fins" or fins around the outer diameter of the housing. Air from the air cycle machine is passed over these fins to enhance conductive cooling of the stator windings through the single housing wall.

SUMMARY

An embodiment of an electric motor assembly includes a stator assembly extending generally along the longitudinal axis and at least partially enclosing a rotor assembly also extending along the longitudinal axis. The rotor assembly includes a rotating portion and one or more sets of rotor windings. The stator assembly includes a stationary housing having at least an inner wall and an outer wall, and one or more sets of stator windings in electromagnetic communication with the one or more sets of rotor windings. A heat exchanger is integrally formed into the housing, and includes a plurality of dividing walls extending between the inner and outer housing walls. The plurality of dividing walls are arranged at least partially circumferentially around the longitudinal axis to define, with the inner and outer walls, a corresponding plurality of integral heat exchanger channels arranged at least partially circumferentially around the one or more sets of stator windings. A plurality of rib turbulators are disposed on at least one of a channel-facing surface of the inner wall, outer wall, or dividing wall.

An embodiment of a motor housing includes an outer cylindrical wall annularly disposed about an inner cylindrical wall, and a heat exchanger integrally formed into the housing. The integral heat exchanger includes a plurality of dividing walls extending between the inner and outer housing walls, the plurality of dividing walls arranged at least partially circumferentially around the longitudinal axis to define, with the inner and outer walls, a corresponding plurality of integral heat exchanger channels having first and second channel ends extending generally axially between first and second longitudinal ends of the housing. A plurality of rib turbulators are disposed on at least one of a channel-facing surface of the inner wall, outer wall, or dividing wall.

An embodiment of a method for forming a motor housing includes forming a sacrificial model of the motor housing, including a model of each of an inner cylindrical wall, an outer cylindrical wall, a plurality of dividing walls, and a plurality of rib turbulators. The mold is placed into a suitable casting medium. Molten metal is poured into the casting medium such that the molten metal takes the place of the sacrificial model. The poured molten metal is cooled, thereby providing a solid near-net metal shape of the motor housing.

DETAILED DESCRIPTION

Figure 1:
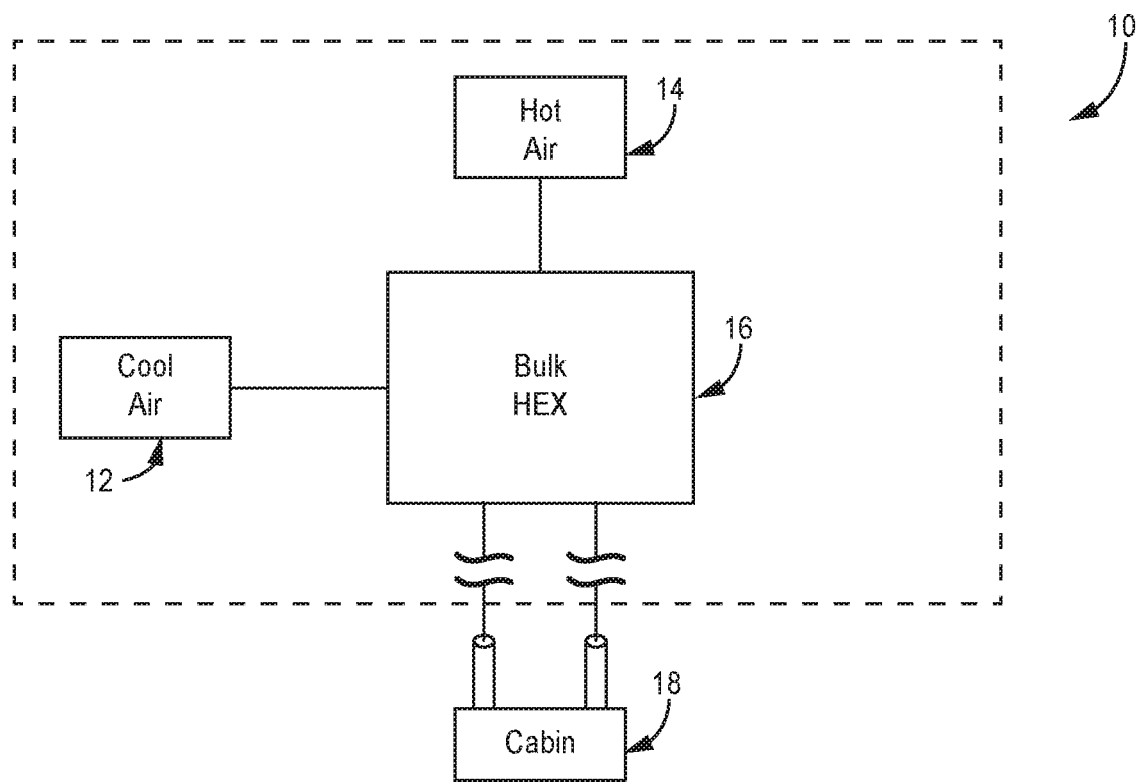
FIG. 1 is a block diagram of a typical cabin air conditioning (CAC) system.

FIG. 1 is a block diagram showing general elements of a cabin air conditioning (CAC) system for an aircraft. CAC system 10 includes cool air source 12 (typically external ambient air), hot compressed air source 14 (typically engine bleed air), bulk heat exchanger (HEX) 16, and piping 18 to and from the cabin. Operations of CAC systems vary and most of the details are outside the scope of the disclosure, but the goal is to provide conditioned air to the cabin in a relatively efficient manner, while preventing freeze-up, by exchanging thermal energy between bypass air, bleed air, and recycled cabin air. In this instance, CAC system 10 is electrically operated via one or more motor assemblies 20, details of which are shown in subsequent figures.

Figure 2:
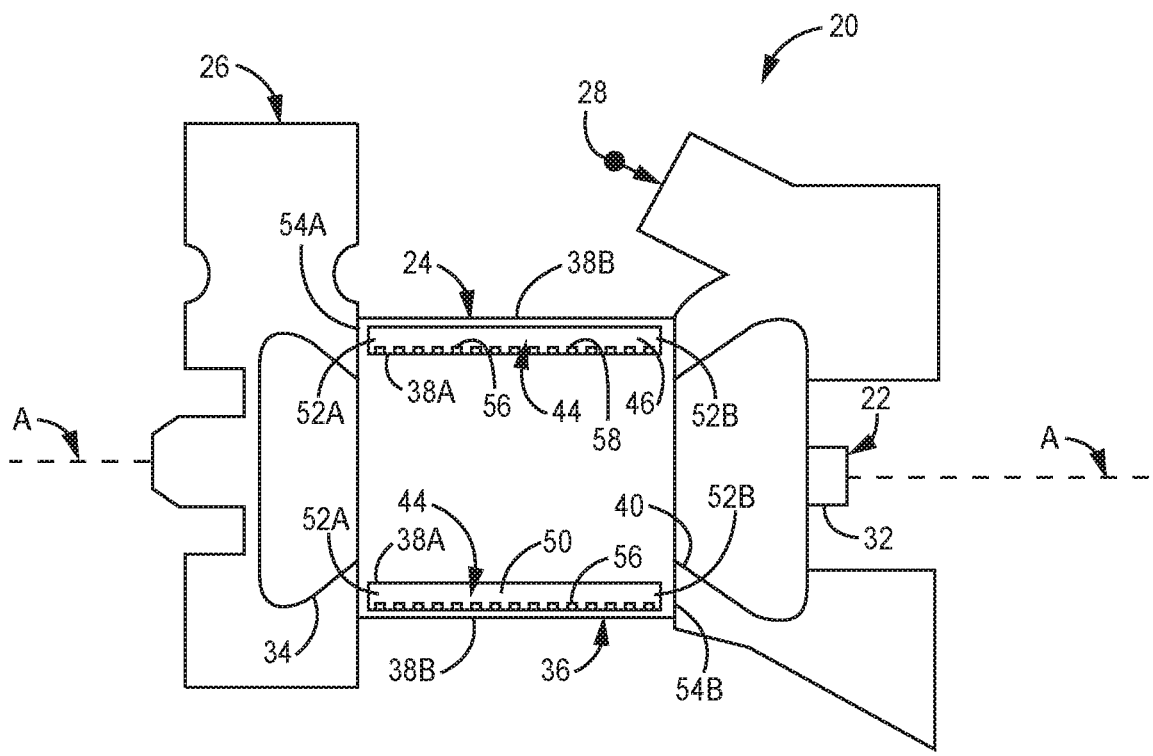
FIG. 2 shows an electric motor for an air cycle machine (ACM).
Figure 3:
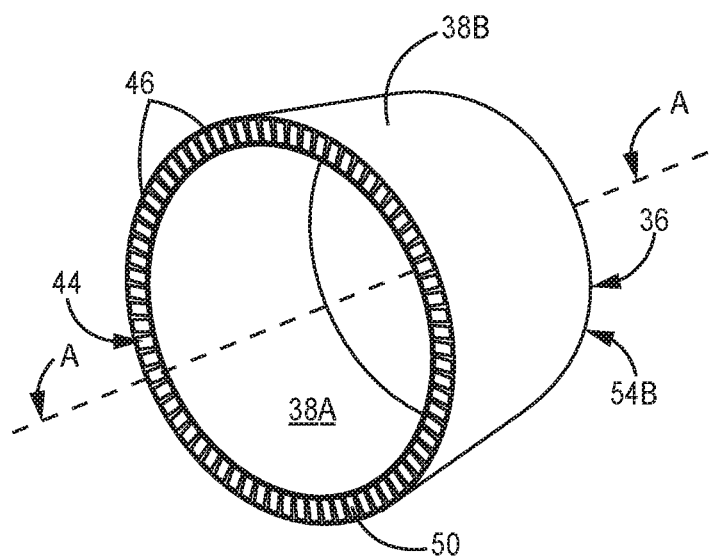
FIG. 3 is a first view of an electric motor for use in FIG. 2.

FIG. 2 is a sectional view of CAC electrical motor assembly 20, which generally includes rotor assembly 22, stator assembly 24, coolant inlet 26, and coolant outlet 28. Rotor assembly 22 and stator assembly 24 extend generally along longitudinal axis A. FIG. 3 is a perspective view of stator assembly 24.

Rotor assembly 22 includes rotating portion 32 and one or more sets of rotor windings 34, depending on whether motor assembly 20 is designed to use one-phase or three-phase power. Stator assembly 24 also extends generally along longitudinal axis A and at least partially encloses rotor assembly 22. Stator assembly 24 can include at least stationary housing 36 having at least annular inner cylindrical wall 38A and outer cylindrical wall 38B (outer wall 38B radially outward from inner wall 38A), as well as one or more sets of stator windings 40 in electromagnetic communication with the one or more sets of rotor windings 34 upon insertion of rotor assembly 22 into housing 36.

Conventionally, a stator such as is shown in FIG. 2 would have a single wall and fins extending outward from an outer surface of the otherwise smooth wall. The increased surface area would increase conductive heat transfer away from the stator housing. However, advancements and increased electrical demands can still increase heat buildup to the point where the motor life is shortened.

To improve efficiency, heat exchanger 44 can be integrally formed into stator housing 36 and includes at least a plurality of dividing walls 46 extending between inner and outer housing walls 38A, 38B. The plurality of dividing walls 46 can be arranged at least partially circumferentially around longitudinal axis A to define, with inner and outer walls 38A, 38B, a corresponding plurality of integral heat exchanger channels 50 arranged at least partially circumferentially around and/or axially between the one or more sets of stator windings 40. Each of the integral heat exchanger channels 50 can have first and second channel ends 52A, 52B extending generally axially between first and second longitudinal ends 54A, 54B of housing 36.

To further increase cooling efficiency, a plurality of rib turbulators 56 (best seen in FIG. 5) can also be disposed on at least a channel-facing surface 58 of inner wall 38A. This causes repeated detachment and reattachment of the boundary layer of coolant through channels 50, thereby significantly increasing both convective cooling and conduction through wall 38A. Though omitted for clarity, rib turbulators 56 can additionally and/or alternatively be disposed on channel facing surface(s) of outer wall 38B and/or dividing walls 46.

FIG. 2 also shows first channel end 52A of at least one of the integral heat exchanger channels in communication with an incoming source of cooling air at inlet 26, such as from an air cycle machine for an aircraft (see, e.g., FIG. 1). Second channel end 52B is in communication with discharge outlet 28. It will be appreciated that inlet 26 and outlet 28 may be reversed in some configurations relative to channel ends 52A, 52B.

Also in FIG. 3, (also visible in FIG. 4), it can be seen that at least part of one or both dividing walls 46 can be normal to at least one of the inner and outer walls 38A, 38B. Additionally or alternatively, therefore, a cross-section of channels 44 can be selected from round, square, variable, and combinations thereof.

Figure 4:
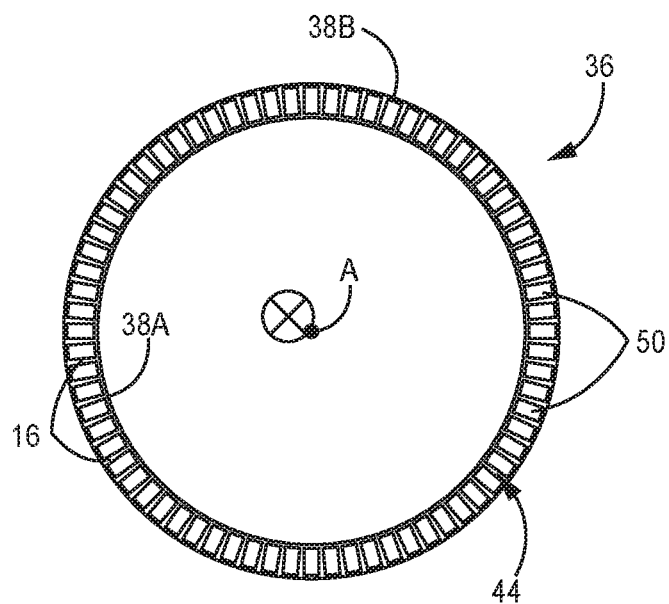
FIG. 4 is a second view of the electric motor in FIG. 2.
Figure 5:
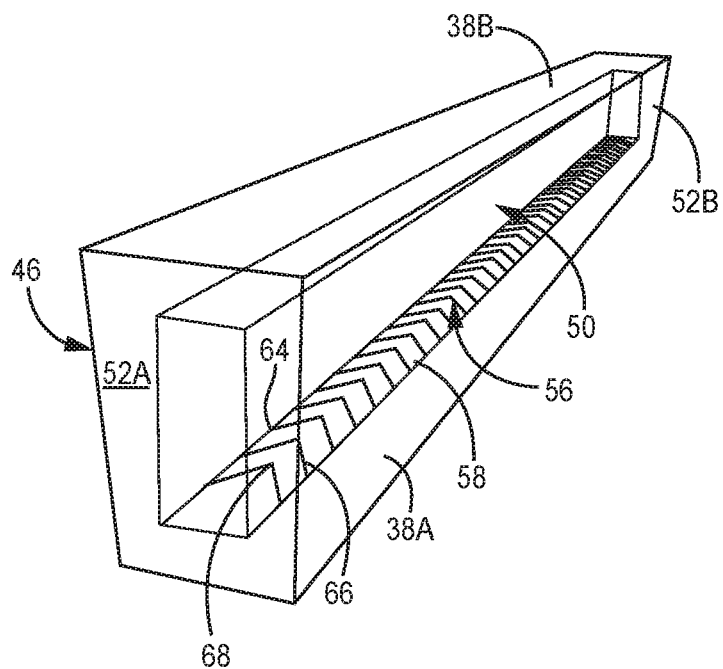
FIG. 5 is a sectional view of a cooling channel and rib turbulators for the electric motor stator.

Moving to FIGS. 4 and 5, FIG. 4 is a longitudinally facing sectional view of housing 36 with integral heat exchanger 44, while FIG. 5 is a perspective/sectional view of an example channel 50, a plurality of which form integral heat exchanger 44 within housing 36. Here, example channel 50 is purely axial; that is flow through channel 50 is effectively straight, over the same circumferential range between first and second channel ends 52A, 52B (generally coterminous respectively with housing longitudinal ends 54A, 54B in FIG. 3). However, it will also be appreciated that in certain embodiments, at least one of the integral heat exchanger channels 50 can include both an axial and a circumferential component between first second channel ends 52A, 52B. As a result, a combination of the axial and circumferential components result in one or more of a spiral channel portion, a staggered step portion, and an undulating portion, as well as other regular or irregular patterns.

In FIG. 5, at least one of the plurality of rib turbulators 56, along channel 50, includes a first elongated section 64 forming an acute or right angle to an adjacent dividing wall defining the channel 44 in which the at least one of the turbulators 56 is contained. In the example shown, at least some of rib turbulators 56 are chevrons with two angled elongated portions 64, 66 meeting at point or peak 68. Point/peak 68 can be, but is not required to be facing downstream toward outlet 28 (shown in FIG. 2) and/or channel end 52B.

To integrally form heat exchanger channels into the housing, with a plurality of rib turbulators disposed on at least a channel-facing surface of the inner wall, the housing can be formed by casting. At its simplest, a sacrificial model of the motor housing can be formed. This model can include a model of each of the inner cylindrical wall, the outer cylindrical wall, the plurality of dividing walls, and the plurality of rib turbulators. The mold, which may be wax, foam, or other suitable sacrificial material, can be placed into a suitable casting medium such as but not limited to sand. Molten metal, such as an aluminum alloy, is then poured into the casting medium such that the molten metal takes the place of the sacrificial model. After cooling the poured molten metal, a solid near-net metal shape of the motor housing is formed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric motor assembly comprising:
   a rotor assembly extending along a longitudinal axis, the rotor assembly including a rotating portion and one or more sets of rotor windings;
   a stator assembly extending generally along the longitudinal axis and at least partially enclosing the rotor assembly, the stator assembly including a stationary housing having at least an inner wall and an outer wall, and one or more sets of stator windings in electromagnetic communication with the one or more sets of rotor windings; and
   a heat exchanger integrally formed into the housing, the heat exchanger comprising:
      a plurality of dividing walls extending between the inner and outer housing walls, the plurality of dividing walls arranged at least partially circumferentially around the longitudinal axis to define, with the inner and outer walls, a corresponding plurality of integral heat exchanger channels arranged at least partially circumferentially around the one or more sets of stator windings, each of the integral heat exchanger channels having first and second channel ends extending generally axially between first and second longitudinal ends of the housing; and
      a plurality of rib turbulators disposed on at least a channel-facing surface of the inner wall, wherein at least one of the plurality of rib turbulators includes a first elongated section forming an acute or right angle to an adjacent dividing wall defining the channel in which the at least one of the turbulators is contained such that the at least one of the plurality of rib turbulators includes a chevron with a peak of the chevron facing an oncoming direction of cooling air.

2. The motor assembly of claim 1, wherein the first channel end or second channel end of at least one of the integral heat exchanger channels is in communication with an incoming source of cooling air, and the other of the first and second channel ends is in communication with a discharge outlet.

3. The motor assembly of claim 2, wherein the incoming source of cooling air is an air cycle machine for an aircraft.

4. The motor assembly of claim 1, wherein the plurality of dividing walls are normal to at least one of the inner and outer walls.

5. The motor assembly of claim 1, wherein a cross-section of the channels are selected from round, square, variable, and combinations thereof.

6. The motor assembly of claim 1, wherein at least one of the integral heat exchanger channels includes both an axial component and a circumferential component between the first and second longitudinal ends.

7. The motor assembly of claim 1, wherein a combination of the axial component and the circumferential component results in one or more of: a spiral channel portion, a staggered step portion, and an undulating portion.

8. A motor housing comprising:
   an inner cylindrical wall;
   an outer cylindrical wall radially disposed about the inner cylindrical wall;
   a plurality of dividing walls extending between the inner cylindrical wall and the outer cylindrical wall defining a plurality of integral flow channels extending axially through the motor housing; and a plurality of rib turbulators each of which extend into one of the flow channels from at least one of the inner cylindrical wall, the outer cylindrical wall and one of the plurality of dividing walls, wherein at least one of the plurality of rib turbulators includes a first elongated section forming an acute or right angle to an adjacent dividing wall defining the channel in which the at least one of the turbulators is contained such that the at least one of the plurality of rib turbulators includes a chevron with a peak of the chevron facing an oncoming direction of cooling air.

9. The motor housing of claim 8, further comprising:
one or more sets of stator windings positioned about the inner wall so as to be in electromagnetic communication with one or more sets of rotor windings upon insertion of a rotor assembly into the motor housing.

10. The motor housing of claim 8, wherein the plurality of dividing walls are normal to at least one of the inner and outer walls.

11. The motor housing of claim 8, wherein a cross-section of the channels are selected from round, square, variable, and combinations thereof.

12. The motor housing of claim 8, wherein at least one of the integral heat exchanger channels includes both an axial component and a circumferential component between the first and second longitudinal ends.

13. The motor housing of claim 12, wherein a combination of the axial component and the circumferential component results in one or more of: a spiral channel portion, a staggered step portion, and an undulating portion.

14. A method of making a motor housing comprising:
an inner cylindrical wall;
an outer cylindrical wall annularly disposed about the inner cylindrical wall; and
a heat exchanger integrally formed into the motor housing, the heat exchanger comprising:
  a plurality of dividing walls extending between the inner and outer housing walls, the plurality of dividing walls arranged at least partially circumferentially around the longitudinal axis to define, with the inner and outer walls, a corresponding plurality of integral heat exchanger channels having first and second channel ends extending generally axially between first and second longitudinal ends of the housing; and
  a plurality of rib turbulators disposed on at least a channel-facing surface of the inner wall, wherein at least one of the plurality of rib turbulators includes a first elongated section forming an acute or right angle to an adjacent dividing wall defining the channel in which the at least one of the turbulators is contained such that the at least one of the plurality of rib turbulators includes a chevron with a peak of the chevron facing an oncoming direction of cooling air;
wherein the method comprises:
  forming a sacrificial model of the motor housing, including a model of each of the inner cylindrical wall, the outer cylindrical wall, the plurality of dividing walls, and the plurality of rib turbulators;
  placing the mold into a suitable casting medium;
  pouring molten metal into the casting medium such that the molten metal takes the place of the sacrificial model; and
  cooling the poured molten metal, thereby providing a solid near-net metal shape of the motor housing.

15. The method of claim 14, wherein the casting medium is sand.

16. The method of claim 14, wherein the molten metal is an aluminum alloy.

* * * * *